Feb. 13, 1951 L. SCHAPERKOTTER ET AL 2,541,890
TACKLE BOX
Filed Dec. 14, 1946 3 Sheets-Sheet 3

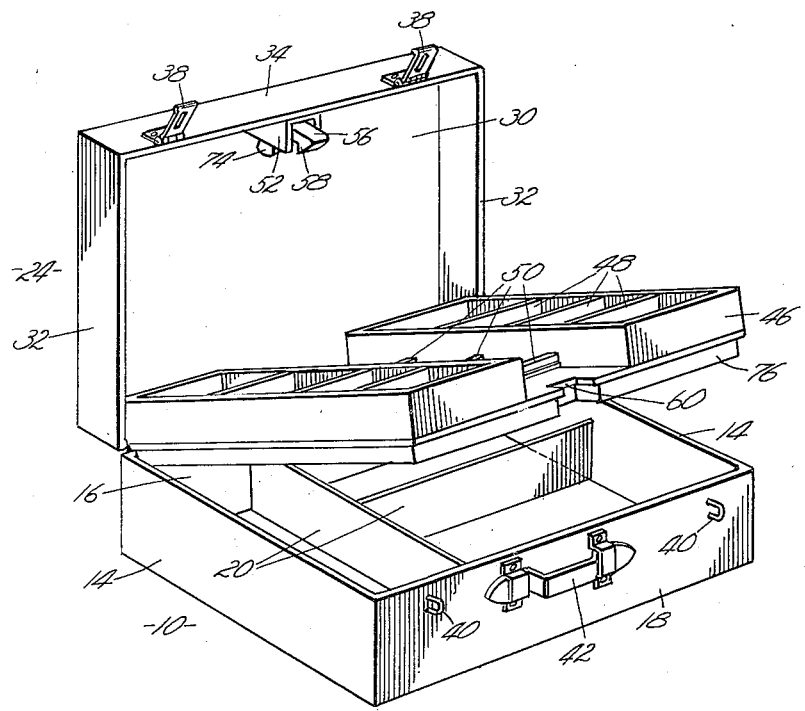

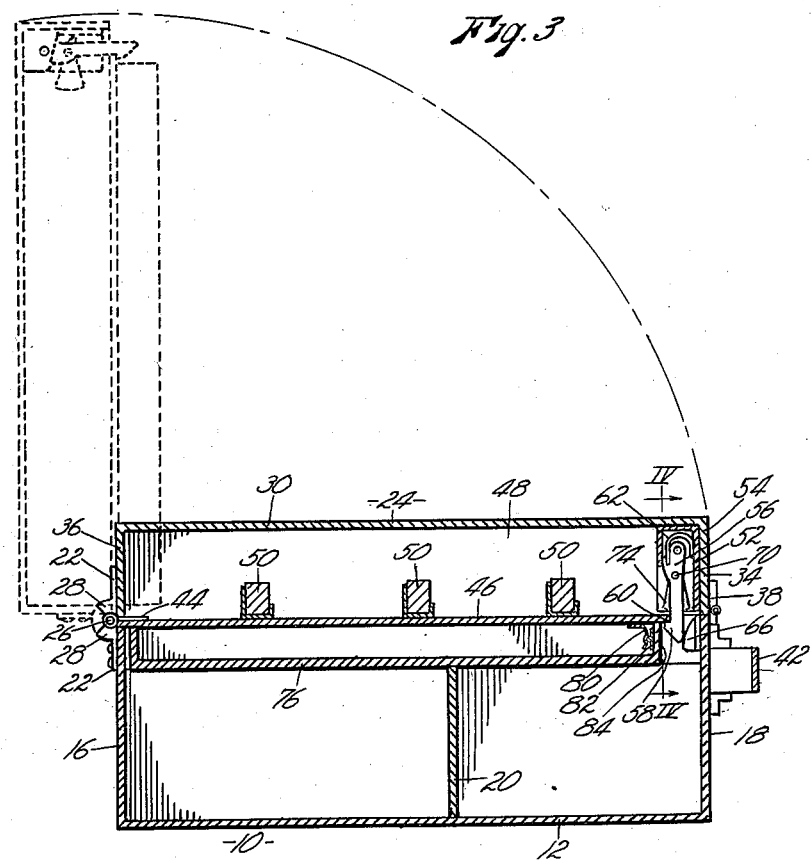
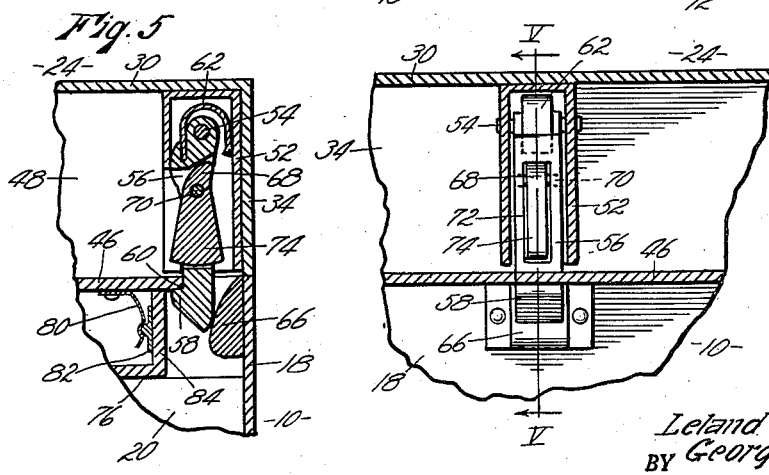

INVENTORS,
Leland Schaperkotter,
BY George W. Kline.
Roy C. Hamilton,
Attorney.

Patented Feb. 13, 1951

2,541,890

UNITED STATES PATENT OFFICE 2,541,890

TACKLE BOX

Leland Schaperkotter, Kansas City, Kans., and George W. Kline, Fayette, Mo.

Application December 14, 1946, Serial No. 716,342

5 Claims. (Cl. 312—222)

This invention relates to new and useful improvements in a tackle box for fishing tackle and the like, and has particular reference to a tackle box containing hinged tray members therein.

The principal object of the present invention is the provision of a tackle box having a hinged cover and a tray member adapted to be contained in said cover, said cover and said tray being hingeably carried by said box on a common pintle, and said box cover serving also as a lid for said tray to prevent spilling of tackle from the tray when said cover is tilted.

Another object is the provision of a manually operated latch releasably securing said tray in said cover, said latch being secured against release except when the cover is disposed at a predetermined acute angle to the horizontal.

A further object is the provision of stops whereby the opening of said cover is limited.

Other objects are simplicity and economy of construction, and convenient and positive operation.

With these objects in view, as well as further objects which will become apparent during the course of the specification, reference will be had to the drawings, wherein:

Figure 1 is a perspective view of a tackle box embodying the present invention, shown in the open position with the trays released from the box cover.

Fig. 2 is a perspective view of the tackle box in the closed position.

Fig. 3 is an enlarged central vertical section, with the cover shown in the closed position in solid lines, and in its maximum open position in dotted lines.

Fig. 4 is an enlarged fragmentary vertical section taken on line IV—IV of Figure 3.

Fig. 5 is a vertical section taken on line V—V of Figure 4.

Figure 6:
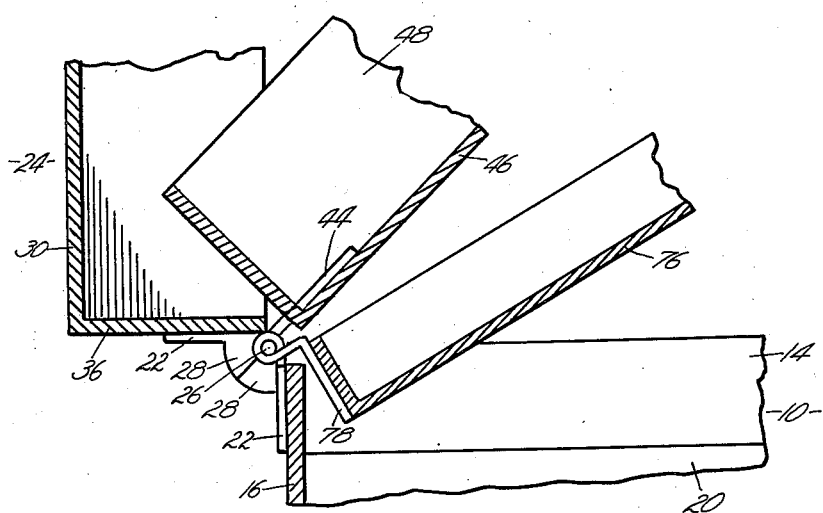
Fig. 6 is an enlarged vertical section taken on line VI—VI of Figure 9.

Like reference numerals apply to similar parts throughout the several views, and the numeral 10 applies to a rectangular box open at the top and having a bottom 12, sides 14, back 16, and front 18. Said box may be divided into any desired compartments as by partitions 20, said partitions not extending to the top of said box. Hingeably attached to said box at the upper edge of the back 16 thereof by means of hinge members 22 is a cover 24, said hinge members being oscillatably mounted on a pintle 26 extending the width of box 10. Said hinge members are equipped with integral stop lugs 28 which will abut as shown in Figure 6, when cover 24 is raised to the vertical position, thus limiting the movement of said cover.

Cover 24 comprises a top 30, sides 32, front 34, and back 36, said sides, front, and back being sufficiently wide to give cover 24 a substantial depth. The box may be secured in the closed position by means of suitable latches 38 rigidly fixed to front 34 of cover 24 and adapted to engage securing members 40 rigidly fixed to front 18 of box 10. Firmly fixed to front 18 of the box is a carrying handle 42.

Pivotally carried on pintle 26 by means of hinge members 44 is a tray 46 adapted to extend into cover 24. Said tray may be divided into compartments as by partitions 48 for containing fishing tackle and the like, and may also carry cork bars 50 into which fishing hooks may be inserted for convenient carrying. Partitions 48 are of such a height as to bear against top 30 of cover 24 when said tray is pivotally swung into said cover, said top thus serving as a lid for the compartments of said tray and preventing spilling of tackle therefrom.

Figure 7:
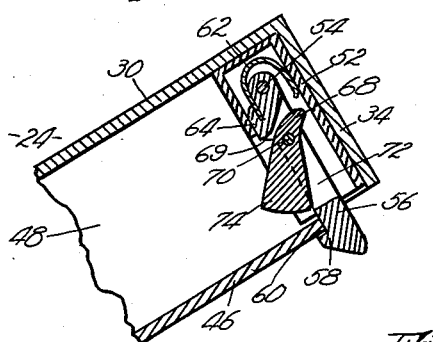
Fig. 7 is a view of the cover and tray as shown in Figure 5, with the cover shown in a partially raised position.
Figure 8:
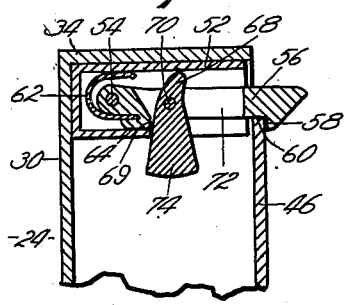
Fig. 8 is a view of the cover and tray as shown in Figure 5, with the cover shown raised to its maximum open position, and with the latch detent in the securing position.
Figure 9:
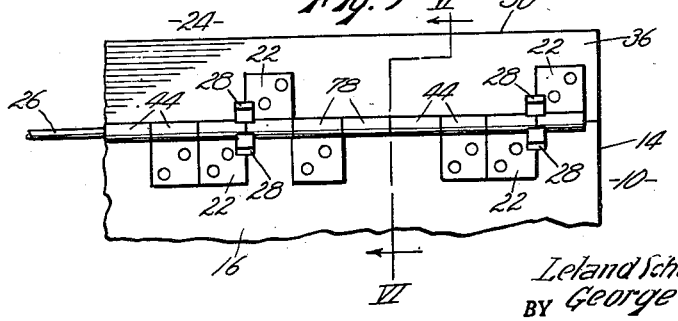
Fig. 9 is a fragmentary rear view of the tackle box, showing a portion of the cover and tray hinges.

A latch body member 52 is rigidly fixed to the inner surface of front 34 of cover 24 at substantially the midpoint thereof. Pivotally carried by said latch body on pin 54 extending horizontally parallel to front 34, is a latch 56 extending downwardly from said pin and having formed at its lower end a hook portion 58 adapted to releasably engage a notch 60 formed therefor in the forward edge of tray 46, thereby releasably retaining said tray within cover 24. Latch 56 is urged rearwardly toward the latched position by means of a flat spring 62 rigidly attached at one end to latch 56 and bearing at its opposite end against latch body member 52. The rearward movement of latch 56 is limited by latch body 52, the surface 64 of said latch abutting against latch body 52, as shown in Figures 7 and 8. Said latch may be disengaged by manually pulling the lower end thereof in a forward direction. When cover 24 is in the closed position against box 10, latch 56 is secured in the rearward latched position by means of a tapered stop block 66 rigidly fixed to front 18 of box 10 at the upper edge thereof, as shown in Figures 3, 4 and 5, thereby preventing accidental release of said latch when the box is closed.

A gravity operable detent 68 is mounted for free pivoting on pin 70 within vertical slot 72 of latch 56, said pin being parallel to pin 54, and the lower end of said detent being enlarged to form a counterweight 74 whereby said detent is maintained in a vertical position by gravity, as shown in Figures 5, 7 and 8. When cover 24 is closed, and until it is opened to approximately the position shown in Figure 7, detent 68 remains inoperative and latch 56 may be manually drawn forward to release tray 46. However, when the cover is raised beyond the position shown in Figure 7, the upper end of detent 68 will come into operative relationship with the forward wall of latch body 52 passing through a plane through pin 70 at right angles to said forward wall, as shown in Figure 8. While in this position, the abutment of said detent against said forward wall will secure latch 56 in its rearward latched position, preventing the release of tray 46. Thus, it will be seen that said tray can not be released from cover 24 except when said tray is at a predetermined acute angle to the horizontal, thereby preventing the spilling of tackle from the tray which would result if it were released from the cover while said cover was in a steeply tilted position. If cover 24 should be tilted past the vertical position shown in Figure 8, as by tilting the entire box to the rear, detent 68 will be retained in the locking position shown in Figure 8 by stop surface 69 of latch 68, thus preventing the disengagement of said latch when said cover is in an inverted position.

If desired, a tray 76 may be pivotally connected to pintle 26 by means of hinge members 78. Said tray is adapted to be contained in the upper portion of box 10, and to serve as a hinged lid for the compartments formed therein by partitions 20. Said tray is also adapted to abut against the lower face of tray 46, the latter thereby serving as a hinged lid for the former. The forward edge of tray 76 is releasably secured to the lower face of tray 46 by means of a spring fastener 80 fixed to tray 46, which frictionally engages a securing member 82 fixed to the forward wall 84 of tray 76.

The improvements we claim as new and desire to protect by Letters Patent are:

1. A box for fishing tackle and the like comprising a box member, a cover hingeably carried by said box member, a tray hingeably carried within said box to extend into said cover, a latch releasably securing said tray to said cover, and a pivotally mounted member securing said latch from operation except when said cover is inclined at less than a predetermined acute angle to the horizontal.

2. A box for fishing tackle and the like comprising a box member, a cover hingeably carried by said box member, a tray hingeably carried within said box and extendable into said cover, and gravity operable means releasably securing said tray to said cover whereby said tray may be released from said cover only when said cover is inclined at less than a predetermined acute angle to the horizontal.

3. A box for fishing tackle and the like having a hinged cover, a tray hingeably carried within said box and extendable into said cover, and a latch releasably securing said tray to said cover, and gravity operable means whereby said latch is prevented from releasing said tray from said cover except when said cover is inclined at less than a predetermined acute angle to the horizontal.

4. A box for fishing tackle and the like having a hinged cover, a tray hingeably carried within said box and extendable into said cover, a latch hingeably carried by said cover and adapted to releasably secure said tray thereto, and a detent operable by gravity to swing into engagement with a rigid stop member whenever said cover is raised farther than a predetermined acute angle to the horizontal, whereby said latch is precluded from releasing said tray from said cover except when said cover is inclined at less than said predetermined acute angle to the horizontal.

5. A box for fishing tackle and the like having a hinged cover, a tray carried within said box and extendable into said cover, said tray and said cover being hingeably attached to said box on a common pintle, a manually operable latch pivotally carried by said cover and adapted releasably to secure said tray in said cover, a spring urging said latch toward the latching position, and a gravity operated detent pivotally carried by said latch for cooperation with parts of the latch whereby said latch is secured in the latching position except when said cover is inclined at less than a predetermined acute angle to the horizontal.

LELAND SCHAPERKOTTER.
GEORGE W. KLINE.

REFERENCES CITED

The following references are of record in the file of this patent:

UNITED STATES PATENTS

| Number | Name | Date |
|---|---|---|
| 765,128 | Clark | July 12, 1904 |
| 831,064 | Hardesty | Sept. 18, 1906 |
| 2,150,064 | John et al. | Mar. 7, 1939 |
| 2,295,221 | King | Sept. 8, 1942 |